(12) United States Patent
Lanzafame et al.

(10) Patent No.: US 7,006,511 B2
(45) Date of Patent: Feb. 28, 2006

(54) DYNAMIC JITTER BUFFERING FOR VOICE-OVER-IP AND OTHER PACKET-BASED COMMUNICATION SYSTEMS

(75) Inventors: Christopher Lanzafame, West Deal, NJ (US); Christopher B. Moran, Middletown, NJ (US); Richard Szajdecki, Jackson, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 938 days.

(21) Appl. No.: 09/907,120

(22) Filed: Jul. 17, 2001

(65) Prior Publication Data

US 2003/0026275 A1   Feb. 6, 2003

(51) Int. Cl.
*H04L 12/28* (2006.01)
*H04L 12/56* (2006.01)

(52) U.S. Cl. .............. 370/412; 370/429; 370/516; 375/371

(58) Field of Classification Search .......... 370/252, 370/412, 429, 508, 516, 517, 519; 375/371, 375/372

See application file for complete search history.

(56) References Cited

U.S. PATENT DOCUMENTS

| | | | |
|---|---|---|---|
| 5,784,047 A * | 7/1998 | Cahill et al. ............. | 345/660 |
| 5,940,479 A | 8/1999 | Guy et al. | |
| 6,587,506 B1 * | 7/2003 | Noridomi et al. ...... | 375/240.12 |
| 6,829,244 B1 * | 12/2004 | Wildfeuer et al. ......... | 370/412 |
| 6,862,298 B1 * | 3/2005 | Smith et al. ................ | 370/516 |

FOREIGN PATENT DOCUMENTS

WO   WO 01/22710 A2   3/2001

OTHER PUBLICATIONS

H. Schulzrinne et al., "RTP: A Transport Protocol for Real-Time Applications," http://www.ietf.org/rfc/rfc1889.txt?number=1889, pp. 1-66, Jan. 1996.

* cited by examiner

*Primary Examiner*—Dang Ton
*Assistant Examiner*—Inder Pal Mehra
(74) *Attorney, Agent, or Firm*—Ryan, Mason & Lewis, LLP

(57) ABSTRACT

A variable-size jitter buffer is used to store information associated with a voice signal, facsimile signal or other received signal in a receiver of a packet-based communication system. The receiver determines an appropriate adjustment time for making an adjustment to the size of the buffer based at least in part on a result of a signal detection operation performed on the received signal. For example, in the case of a received voice signal, the determined adjustment time may be a time at which a state machine associated with a speech detector is in a "no speech" state. If the actual buffer size at the determined adjustment time is not within a designated range of a target computed at least in part based on one or more jitter measurements, the buffer size is adjusted at the determined adjustment time, e.g., by an amount representative of the difference between the actual buffer size and the target. The invention provides low-delay and low-complexity jitter buffering particularly well suited for use in an Internet Protocol (IP) receiver of a voice-over-IP system.

20 Claims, 6 Drawing Sheets

DYNAMIC JITTER BUFFERING FOR VOICE-OVER-IP AND OTHER PACKET-BASED COMMUNICATION SYSTEMS

FIELD OF THE INVENTION

The present invention relates generally to packet-based communication systems suitable for transmitting voice or other information, and more particularly to receiver buffering techniques for use in such systems.

BACKGROUND OF THE INVENTION

Information is transmitted over an Internet Protocol (IP) network in asynchronous packets. As a result, voice-over-IP systems generally require that a given IP receiver include a jitter buffer that allows the receiver to convert asynchronous received packets to a synchronous voice signal suitable for presentation in an audibly-perceptible format or for further transmission over a synchronous network. A given jitter buffer typically occupies a particular amount of physical memory. The term "jitter buffer size" as used herein refers to the portion of the jitter buffer that actually contains signal samples, and is also commonly referred to as the "jitter buffer build-out" or the "jitter buffer delay." The jitter buffer size varies continuously as packets arrive and a synchronous voice signal output is generated at the synchronous interface. The jitter buffer size is limited by the amount of physical memory allocated to the corresponding voice channel. In general, it is desirable that the jitter buffer size be sufficiently large to allow adaptation to changing conditions, while at the same time not be so large as to add unnecessary delay in the voice transmission path.

Conventional techniques for determining and adjusting jitter buffer size suffer from a number of significant drawbacks. For example, these techniques have been unable to provide efficient and effective determination of a target buffer size that represents an optimal compromise between buffer delay and probability of packet overrun. In addition, conventional techniques have been unable to provide adequate adjustment to the jitter buffer size in real time and with minimal disruption to the voice signal. Another drawback is that existing conventional jitter buffer techniques are unduly complex and thus require excessive processing resources, yet nonetheless fail to provide commensurate voice quality benefits.

In view of the above, it is apparent that a need exists for improved techniques for determining and adjusting receiver jitter buffer size in voice-over-IP systems and other packet-based communication systems, in a manner that exhibits low delay, low complexity, and high voice quality, so as to overcome the previously-described problems associated with conventional buffering techniques.

SUMMARY OF THE INVENTION

The present invention provides low-delay, low-complexity dynamic jitter buffering techniques particularly well suited for use in an Internet Protocol (IP) receiver in a voice-over-IP communication system. Advantageously, the techniques of the invention require substantially less processing resources than conventional techniques, and yet can provide high reconstructed signal quality in real-time applications.

In accordance with one aspect of the invention, a variable-size jitter buffer is used to store information associated with a received signal in a receiver of a packet-based communication system. The receiver determines an appropriate adjustment time for making an adjustment to the jitter buffer size based at least in part on a result of a signal detection operation performed on the received signal. The signal detection operation is preferably implemented using a state machine having entry, active, idle and holdover states. In the case of a received voice signal, the entry, active and idle states correspond to speech entry, speech active and no speech states, respectively. Typically, the determined adjustment time corresponds to a time at which the state machine is in the idle state. If the jitter buffer size at the determined adjustment time is not within a designated range of a target computed at least in part based on one or more jitter measurements, the jitter buffer size is adjusted at the determined adjustment time by an amount representative of the difference between the jitter buffer size and the target.

In accordance with another aspect of the invention, the active state of the state machine is entered from the entry state if a particular level of detected signal energy is present for at least a designated amount of time. The designated amount of time may be on the order of about 20 to 50 milliseconds.

In accordance with yet another aspect of the invention, the holdover state of the signal detection state machine is entered from the active state if the detected signal energy drops below a threshold level. Once the state machine enters the holdover state it remains in the holdover state for at least about 100 to 200 milliseconds. This provides a hysteresis effect which prevents excessively rapid transitions between the active and idle states.

DETAILED DESCRIPTION OF THE INVENTION

Figure 1:
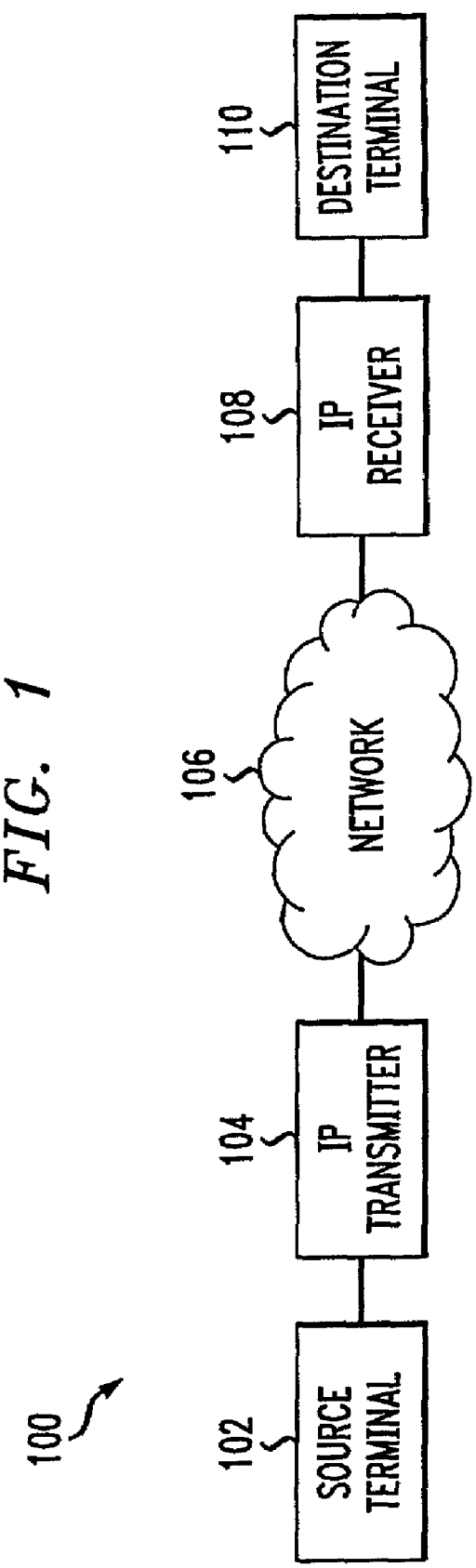
FIG. 1 is a block diagram of an exemplary packet-based communication system in which the present invention is implemented.

The present invention will be illustrated below in conjunction with an exemplary voice-over-IP communication system. It should be understood, however, that the disclosed buffering techniques are suitable for use with a wide variety of other types of packet-based systems including, for example, Asynchronous Transfer Mode (ATM) and Frame Relay systems. The term "packet" as used herein is intended to include not only IP packets but also other types of packets used in other packet-based communication systems. The term "voice" is used herein are intended to include speech and other human-generated audio information, machine-generated audio information or combinations of these and other types of audio information. It should be noted that the invention is generally applicable to any type of audio information. The invention can also be applied to other types of signals, including facsimile signals, signaling tones, etc.

Before the invention is described in detail, some additional terminology will be introduced, as follows. The jitter buffer "target" is the desired jitter buffer size as determined in a manner to be described below. The term "jitter buffer size" was previously described herein. The dynamic jitter buffering in the illustrative embodiment of the invention is preferably configured such that the actual jitter buffer size is as close to the target as possible.

In accordance with the invention, maximum and minimum bounds are placed on the jitter buffer target as follows. The target maximum is typically the amount of physical buffer memory divided by two. For example, in a given embodiment having a 500 millisecond buffer for each voice channel, the target maximum would be 250 milliseconds. The target minimum is based on the known minimum jitter imposed by a particular transmitter and receiver implementation, as well as a quantity referred to herein as the "low water mark" of the receiver, i.e., the target minimum is given by target_min=known_min_jitter+low_water_mark.

The low water mark, which is equal to or lower than the target minimum, is a level at which the jitter buffer size is considered to be so low as to need immediate and substantial corrective action to prevent jitter buffer underrun. This action could involve, e.g., replaying the last packet or another previous portion of the signal, or utilizing interpolation or other error mitigation/concealment feature of the source coder. The low water mark is based on the minimum processing time needed for the receiver to properly perform receiver operations such as depacketize, decode, etc. for a given received packet.

By way of example, suitable target minimum values for use with well-known ITU speech coding standards G.711, G.729 and G.723 are 8 milliseconds (ms), 30 ms and 30 ms, respectively, where each sample comprises 125 microseconds ($\mu s$). Example low water mark values for the G.711, G.729 and G.723 standards are 3 ms, 15 ms and 15 ms, respectively. Of course, these are examples only, and the invention can be used with other standards and other minimum and low water mark values.

In accordance with the invention, a "dynamic low water mark" is one that changes in response to receiver load. In general, it is desirable to have the low water mark and thus the target minimum as low as possible so as to minimize delay. Therefore, in accordance with the techniques of the invention, the low water mark may be configured to adjust itself based on the receiver load. For example, if the receiver is handling only one channel at a given point in time, it may have additional processor resources available at that time. The receiver can therefore respond to a received packet quicker than would otherwise be possible if more channels were being handled, thus allowing for a reduced low water mark. As more channels become active there is a need to increase the low water mark since the additional channels will require more processing resources.

The invention as described in conjunction with FIGS. 1 through 5 will refer to voice signals for purposes of illustration only. The described arrangements and techniques can be modified in a straightforward manner to accommodate other types of signals, e.g., facsimile signals, signaling tones, etc., as will be readily apparent to those skilled in the art. An example receiver state machine for use with a received facsimile signal will be described in conjunction with FIG. 6.

FIG. 1 shows a packet-based voice-over-IP communication system 100 in which the present invention is implemented. The system 100 includes a source terminal 102, an IP transmitter 104, a network 106, an IP receiver 108, and a destination terminal 110. The source and destination terminals 102, 104 may be conventional wired or wireless telephones, personal computers or other types of voice signal processing devices.

In operation, an analog voice signal is generated at the source terminal 102 and delivered to the IP transmitter 104 where it is converted into an appropriate digital format using conventional techniques, and then processed into packets for transmission over the network 106. The IP receiver 108 receives packets containing the digital voice signal from the network 106 and provides a corresponding reconstructed analog signal to the destination terminal 110.

It will be appreciated by those skilled in the art that the source terminal 102 and IP transmitter 104 may be implemented as a single device, such as a personal computer or other device configured to process a voice signal for transmission over an IP network. Similarly, the IP receiver 108 and the destination terminal 110 may be implemented as a single device, such as a personal computer or other device configured to receive voice signal packets and to reconstruct an analog voice signal therefrom. As another example, the IP transmitter 104 and IP receiver 108 may each be an element of a corresponding enterprise switch coupled to the network 106, such as a DEFINITY® Enterprise Communication Service (ECS) communication system switch available from Avaya Inc. of Basking Ridge, N.J., USA.

The present invention in an illustrative embodiment thereof provides a dynamic jitter buffering process that is implemented in the IP receiver 108 of the system 100. The operations of elements 102, 104, 106, 108 and 110 of system 100 are otherwise conventional and will therefore not be further described herein. As noted above, the invention does not require any particular arrangement or configuration of communication system elements. The system 100 is therefore presented by way of example only.

Figure 2:
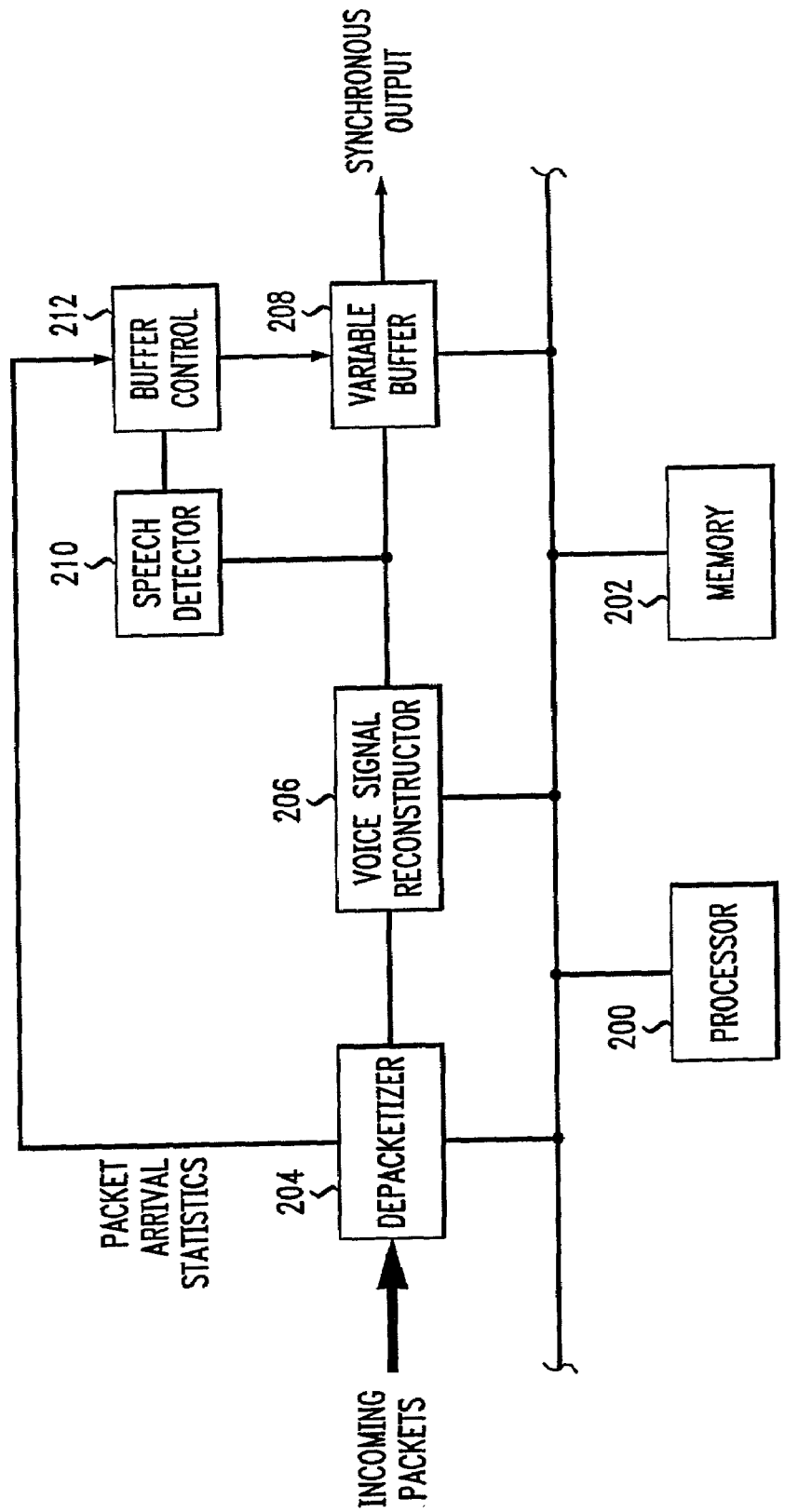
FIG. 2 shows a more detailed view of an IP receiver of the FIG. 1 system configured to implement a dynamic jitter buffering process in accordance with an illustrative embodiment of the invention.

FIG. 2 shows the IP receiver 108 in greater detail. The IP receiver 108 in this embodiment includes a processor 200, a memory 202, a depacketizer 204, a voice signal reconstructor 206, a variable buffer 208, a speech detector 210, and a buffer control element 212. The processor 200 controls the operation of one or more of the other elements of the IP receiver 108 in accordance with one or more software programs stored in memory 202. The variable buffer 208 has a buffer size that varies in accordance with control signals applied thereto by the buffer control element 212, based on packet arrival statistics from the depacketizer 204 and inputs received from the speech detector 210, as will be described in greater detail below in conjunction with the flow diagram of FIG. 5. The variable buffer 208 is also referred to herein as a "jitter" buffer. As indicated previously, the jitter buffer size associated with variable buffer 208 refers to the portion of the jitter buffer that actually contains signal samples, and is also commonly referred to as the "jitter buffer build-out" or "jitter buffer delay."

For simplicity and clarity of illustration, a single variable buffer is shown as an element of the IP receiver 108 in the embodiment of FIG. 2. It should be understood, however, that a given receiver configured in accordance with the techniques of the invention may include multiple variable buffers, each for supporting one or more voice connections established through the network 106. Those skilled in the art will recognize that the buffering techniques described herein with regard to a single illustrative variable buffer are readily applicable to a wide variety of different arrangements of multiple variable buffers.

Incoming packets received from network 106 in the IP receiver 108 are applied to the depacketizer 204. The depacketizer 204 extracts voice signal information from the received packets and supplies this information to the voice signal reconstructor 206. A reconstructed voice signal from the voice signal reconstructor 206 is buffered in the variable buffer 208 and delivered therefrom as a synchronous output to the destination terminal 110 for presentation in an audibly-perceptible format to an associated user. The reconstructed voice signal is also applied to the speech detector 210 for further processing to be described in conjunction with the flow diagram of FIG. 5.

The depacketizer 204, voice signal reconstructor 206 and variable buffer 208 may each be implemented in a well-known conventional manner. It should be noted that the variable buffer 208 may itself be viewed as a variable portion of a receiver physical storage element such as memory 202. Moreover, the particular placement of the variable buffer in the IP receiver in this illustrative embodiment is not a requirement of the invention. For example, in other embodiments, the variable buffer could be configured so as to buffer received packets prior to depacketization and voice signal reconstruction, or to buffer voice signal information after depacketization but prior to voice signal reconstruction.

One or more of the elements 204, 206, 210 and 212 of the receiver 108 may be implemented in whole or in part using software stored in memory 202 and executed by processor 200. Those skilled in the art will recognize that the individual elements of FIG. 2 as shown for illustrative purposes may be combined into one or more processing devices, e.g., an application-specific integrated circuit (ASIC) or other device.

As noted above, the present invention relates to determining an appropriate buffer size for the variable buffer 208 on a dynamic basis so as to minimize delay while also preventing packet overrun. More particularly, in the illustrative embodiment of the invention, a dynamic buffering process first computes a target for the jitter buffer by applying a filter having fast attack and slow decay characteristics to a set of one or more packet delay measurements. Advantageously, such a filter adapts quickly to changing network conditions and yet does not overreact to a deviation of a single packet. After the target size is computed, the process adjusts the jitter buffer size if necessary at a time that is determined to be "safe" based on an analysis of speech components of the received voice signal. As will be apparent from the description below, the overall process requires minimal computational resources and is therefore particularly well suited for use with devices or systems having limited processing power.

Figure 3:
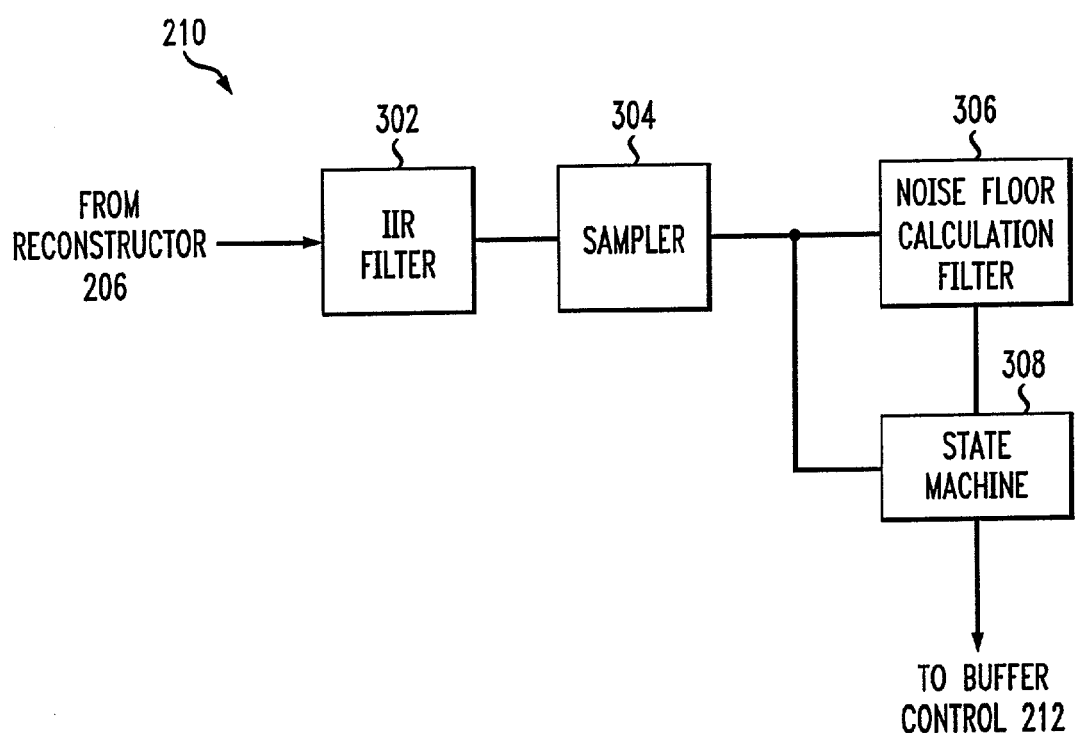
FIG. 3 shows a more detailed view of a speech detector of the IP receiver of FIG. 2.

FIG. 3 shows the speech detector 210 of the IP receiver of FIG. 2 in greater detail. As is well known, a given voice signal generated in conjunction with a telephone conversation will generally include speech portions interspersed with non-speech or silence portions. The speech detector 210 processes a reconstructed voice signal to identify the speech portions thereof and provides an indication as to the presence or absence of speech in a given portion of the signal. This indication is utilized in the IP receiver 108 to determine an appropriate or "safe" time to adjust the size of the variable buffer 208.

As shown in FIG. 3, speech detector 210 comprises an infinite impulse response (IIR) filter 302, a sampler 304, a noise floor calculation filter 306, and a state machine 308. The reconstructed voice signal from reconstructor 206 is applied to an input of the IIR filter 302, and the output of the IIR filter is periodically sampled by sampler 304. The resulting samples are applied to the noise floor calculation filter 306 and to the state machine 308. The state machine 308 processes the samples from sampler 304 in accordance with noise floor information from the filter 306 in order to determine whether or not speech is present in the reconstructed voice signal.

Figure 4:
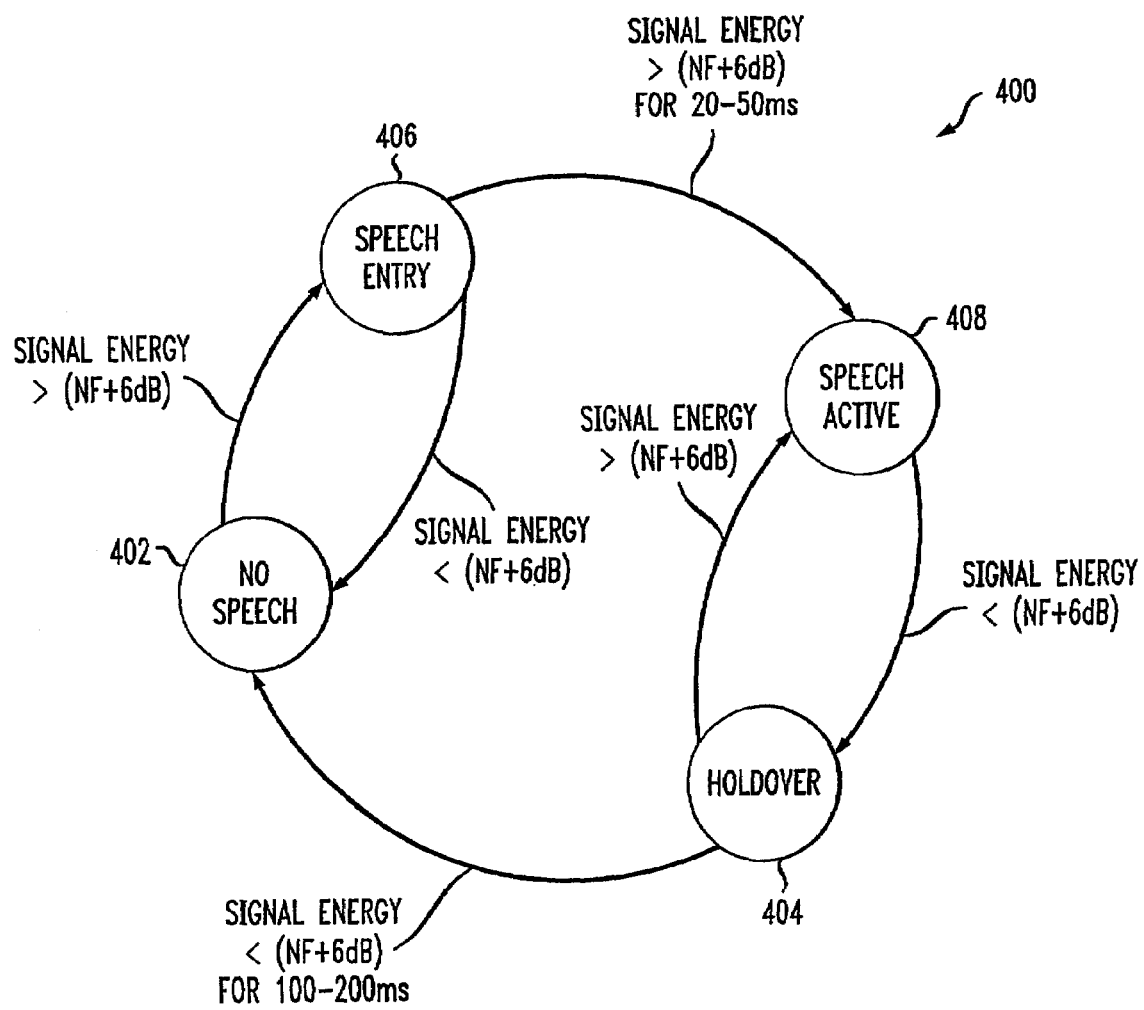
FIG. 4 is a state diagram of a state machine implemented in the speech detector of FIG. 3.

FIG. 4 shows a state diagram 400 for the state machine 308 of FIG. 3. The state diagram 400 in this embodiment includes a no speech state 402, a holdover state 404, a speech entry state 406 and a speech active state 408. The no speech state 402 corresponds to an idle state, and the operation of the state machine will be described starting from this state. As indicated in the diagram, the state machine transitions to the speech entry state 406 from the no speech state 402 if the detected signal energy in a given one of the samples is greater than about 6 dB over the noise floor (NF), where the noise floor is measured by the filter 306. Once the state machine enters the speech entry state 406, a timer is started. If the detected signal energy drops below NF+6 dB while in the speech entry state 406, the state machine returns to the no speech state 402. If the detected signal energy remains above NF+6 dB and the timer reaches a designated value of about 20 to 50 milliseconds, indicating that the state machine has been in the speech entry state 406 for that amount of time, the state machine transitions to the speech active state 408.

The state machine from the speech active state 408 transitions to the holdover state 404 if the detected signal energy drops below NF+6 dB, and from the holdover state 404 returns to the speech active state 408 if the detected signal energy subsequently rises above NF+6 dB. A timer is started once the state machine enters the holdover state 404. If the detected signal energy remains less than NF+6 dB and the timer reaches a designated value of about 100 to 200 milliseconds, indicating that the state machine has been in the holdover state 404 for that amount of time, the state machine transitions to the no speech state 402. The holdover state 404 is thus designed to introduce a hysteresis effect that ensures that the state machine does not transfer too rapidly between the speech active state 408 and the no speech state 402.

Figure 5:
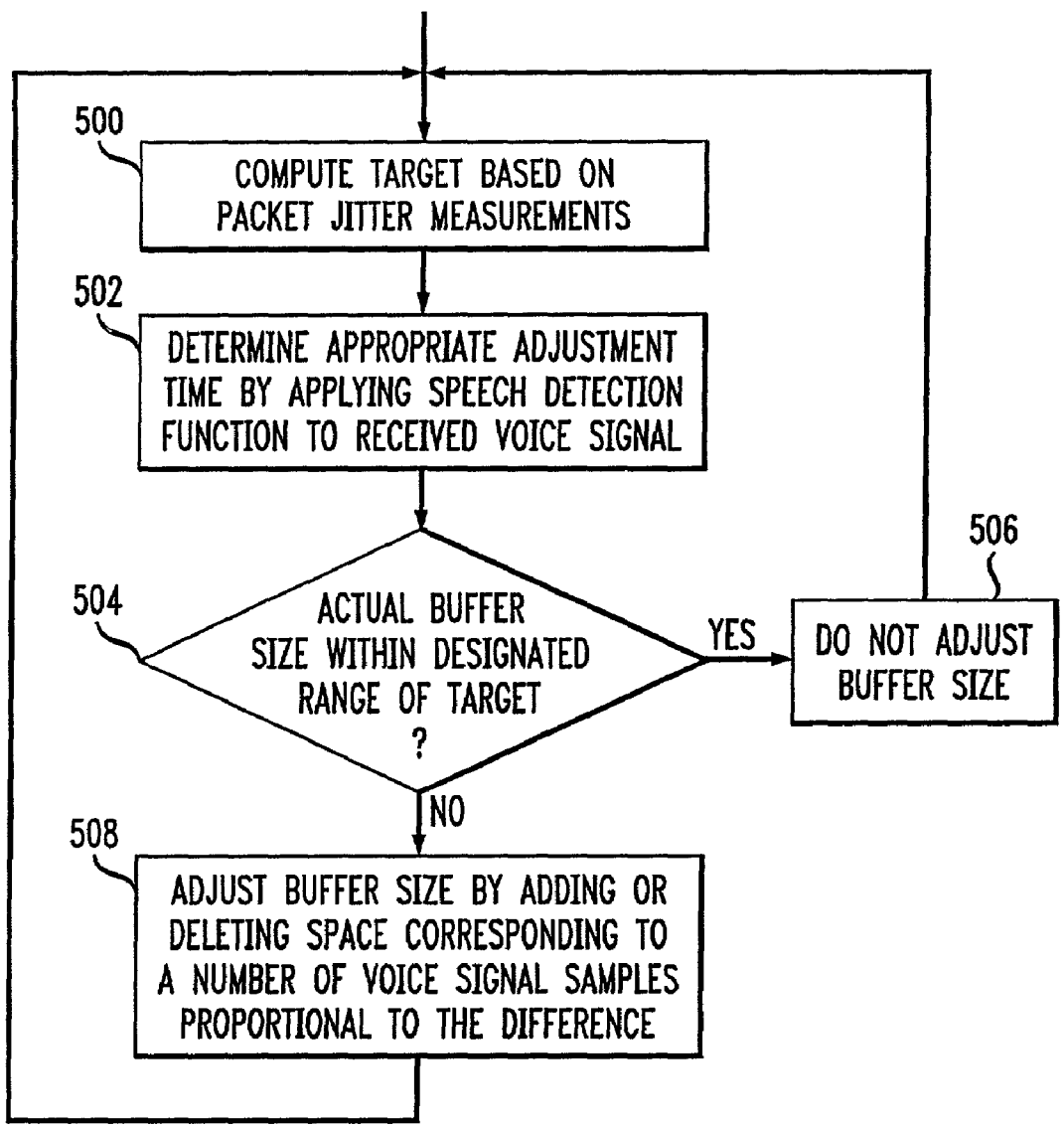
FIG. 5 is a flow diagram of a dynamic jitter buffering process in accordance with the illustrative embodiment of the present invention.

FIG. 5 is a flow diagram of the dynamic buffering process implemented in the IP receiver 108 in accordance with the illustrative embodiment of the invention. This process may be implemented at least in part in software executed by processor 200 of receiver 108. The process can generally be separated into a target size computation stage, an adjustment time determination stage, and a buffer size adjustment stage.

Step 500 corresponds to the target size computation stage of the process. In this step, a target jitter buffer size is computed for the jitter buffer 208. The target jitter buffer size is also referred to herein simply as the "target." A non-complex target size computation technique is generally preferred due to the potentially widely varying behavior of IP networks. In this embodiment, jitter measurements for received packets are performed using techniques similar to those described in Request for Comments (RFC) 1889, "RTP: A Transport Protocol for Real-Time Applications," Internet Engineering Task Force (IETF), www.ietf.org/rfc/rfc1889, January 1996, which is incorporated by reference herein. However, instead of averaging jitter measurements for the received packets as in the above-cited RFC 1889 approach, the jitter measurements in the inventive process are processed using a filter having fast attack and slow decay characteristics. Such a filter provides a "peak stretcher" function.

Examples of suitable values for the fast attack and slow decay characteristics in the illustrative embodiment are about 0.6 and 0.08, respectively. Other values can also be used, as will be apparent to those skilled in the art. It is also possible to determine the values appropriate for use in a given application based on known performance characteristics of the particular transmitter and receiver configuration. For example, the decay value can be determined based on known packet loss concealment characteristics of a particular speech codec. In general, the poorer the packet loss concealment performance in a given application, the slower the decay value that should be selected for that application.

The output of step 500 is a target size for the jitter buffer. A more detailed example of the target size computation using the above-noted fast attack and slow decay filter will be given below.

The target computation in step 500 utilizes the target minimum, target maximum and low water mark values as previously described.

Step 502 corresponds to the adjustment time determination stage of the process. In this step, a speech detection function is performed on the received voice signal in order to determine an appropriate or "safe" time to adjust the buffer size. In general, it is a safe time to adjust the buffer size when there is no speech present in the reconstructed voice signal. The speech detection function is performed using the speech detector 210 of FIG. 3. More particularly, the state machine 308 in speech detector 210 provides an indication as to whether or not speech is present in the reconstructed voice signal, as was previously described in conjunction with FIGS. 3 and 4.

It should be noted that the speech detector 210 need not provide an unduly high level of accuracy in detecting the presence of speech. This is because the buffer size will in practice tend to be adjusted only infrequently, such that a speech detector that is only about 90% accurate will nonetheless produce acceptable results.

In the illustrative embodiment, the IIR filter 302 of the speech detector 210 may be configured to perform signal energy detection using a time constant of about 5 to 10 milliseconds. The output of the IIR filter 302 is sampled about every 5 to 10 milliseconds and the resulting samples are passed through noise floor calculation filter 306 as previously indicated. The filter 306 preferably has a slow attack characteristic, e.g., on the order of seconds, but a fast decay characteristic, e.g., substantially immediate.

The resulting output samples and noise floor calculations are provided to the state machine 308, for processing in the manner indicated in FIG. 4. As noted above, the holdover state 404 provides a hysteresis effect which lessens the likelihood that low level speech portions will be interpreted as non-speech and also bridges short pauses between speech. The holdover state is also important since it is generally desirable to adjust the buffer size when the reconstructed voice signal contains background noise. Such background noise is considered to be "speech" as that term is used herein.

The adjustment time determination in step 502 may bypass the use of speech detector 210 in the event that a packet has not been received for a particular period of time, such as two packet periods, where a packet period denotes the duration of a packet. In this case, the absence of a packet is generally indicative of silence, and thus can be used as an indicator of a safe time for jitter buffer adjustment.

Steps 504, 506 and 508 correspond to the buffer size adjustment stage of the process. Upon entering step 504, the target buffer size and a safe adjustment time are known. It may be assumed without limitation that the jitter buffer stores reconstructed voice information after decoding and thus in the form of linear samples. Although such an arrangement allows improved granularity in the adjustment process, it is not a requirement of the invention.

Step 504 determines if the actual buffer size is within a designated range of the target size. The designated range may be an amount of buffer space corresponding to about 1 millisecond of the reconstructed voice signal. If the actual buffer size is within the designated range, the buffer size is not adjusted, as indicated in step 506, and the process returns to step 500 for the next target size calculation. If the actual buffer is not within the designated range, the buffer size is adjusted in step 508 by deleting or adding buffer space corresponding to a number of samples proportional to the difference between the actual and target sizes. The process will then return to step 500 for the next target size calculation.

In the event that samples need to be added, certain samples may be repeated or white comfort noise may be inserted. Conventional frame erasure capabilities such as those described in the ITU G.729 and G.723 standards may be used, although this will of course limit the granularity of the adjustment.

Maximum and minimum adjustments may be established. An example of a maximum adjustment is an amount of buffer space corresponding to about 5 to 10 milliseconds of reconstructed voice signal. An example of a minimum adjustment is an amount of buffer space corresponding to one or a few samples. In the illustrative embodiment, the adjustment rate may be once for every packet in the presence of packets. In the absence of packets, e.g., for two packet periods, the adjustment may be made automatically, as was noted above.

It is also possible to perform an "emergency" jitter buffer size adjustment, e.g., if a given received signal contains an extended period of uninterrupted speech such that the above-noted adjustments are prevented and the likelihood of buffer underrun or overrun increases. The receiver may therefore be configured in accordance with the invention to allow a jitter buffer adjustment in the presence of speech after expiration of a specified timeout period. This adjustment can utilize more extensive signal processing than an adjustment in a non-speech portion of the signal so as to minimize the disruption to the speech portion. Since it is expected that such emergency adjustments will be required only on a relatively infrequent basis, the extra resources needed will be negligible when averaged over time.

An example target computation for step 500 of FIG. 5 is as follows, where all samples are assumed to be processed in 125 $\mu$s units. The example computation utilizes the following notation:

| | |
|---|---|
| $S_{i-1}$ | timestamp of last received packet |
| $S_i$ | timestamp of currently received packet |
| $R_{i-1}$ | local time snapshot of last received packet |
| $R_i$ | local time snapshot of currently received packet |
| A | filter attack (e.g., .60) |
| B | filter decay (e.g., .08) |

-continued

| | |
|---|---|
| J(i−1, i) | current jitter estimate |
| $J_i$ | new jitter estimate |

As indicated above, the particular values of A and B are selected in this illustrative embodiment so as to increase the target at a rapid rate when jitter is increasing, and to decrease the target at a slow rate when the jitter is decreasing. These values can be adjusted to slow down or speed up the computation of the target. The timestamp of a given packet generally indicates the time at which that packet was sent, e.g., by transmitter 104. Its corresponding "local time snapshot" denotes its arrival time in the receiver 108.

The steps of the target computation are as follows:

1. Compute the jitter between the last and current packets as the absolute value of the timestamp and arrival time differences, in accordance with the above-noted IETF standard jitter measurement:

$$D(i-1, i)=|((S_I-(S_{I-1}))-(R_I-(R_{I-1}))|.$$

2. Compare the result to the current jitter estimate:

$$j=D(i-1, i)-J(i-1, i).$$

3. Determine the new jitter estimate $J_i$ based on j as follows. If j>0, there is more jitter than at the last estimate, so apply the fast attack A to increase the weight of j:

$$J_{i=}J(i-1, i)+j*A;$$

or if j<0, there is less jitter than at the last estimate, so apply the slow decay B to decrease the weight of j:

$$J_{i=}J(i-1, i)+j*B;$$

or if j=0, the estimate remains unchanged:

$$J_{i=}J(i-1, i).$$

The equations given above may be written as follows for the example values given in the respective attack and decay cases:

Attack: $J_{i=}J(i-1, i)(1-A)+D(i-1, i)(A)=J(i-1, i)(0.4)+D(i-1, i)(0.6)$

Decay: $J_{i=}J(i-1, i)(1-B)+D(i-1, i)(B)=J(i-1, i)(0.92)+D(i-1, i)(0.08).$

The terms "fast" and "slow" as used herein with respect to the attack and decay characteristics of the above-described filtering process are intended to include values of A greater than about 0.50 and values of B less than about 0.20.

4. Determine the target buffer size from the new jitter estimate $J_i$, subject to specified target minimum, target maximum and low water mark values determined in the manner previously described. It should be noted that target buffer size need not be updated with every received packet. Instead, it is preferable to update the target less frequently, e.g., once for every five packets received.

5. Update the timestamps, arrival times and jitter estimates as follows:

$$S_{i-1}=S_I$$

$$R_{I-1}=R_I$$

$$J(i-1, i)=J_I.$$

As indicated previously, the example fast attack and slow decay filter process described above is for purposes of illustration only. Those skilled in the art will recognize that the invention can be implemented using other filtering techniques.

In addition, the attack and decay parameters, A and B, respectively, in the above example, can be made selectable under program or manual control. Such selectability can allow customer adjustments, e.g., a well-behaved system may utilize a slower attack or faster decay than in the above example, and vice-versa for a system with more variability.

The FIG. 5 flow diagram indicates that the jitter buffer size may be adjusted only at particular determined adjustment times, which in this illustrative embodiment correspond to periods of time for which the signal detector state machine 308 is in the no speech state 402. Advantageously, such an approach is designed to make the adding or removing of samples from the buffer substantially transparent to one listening to the reconstructed voice signal. It is preferable to add or remove only a few milliseconds of samples to or from the jitter buffer at a time when modifying the jitter buffer size.

Figure 6:
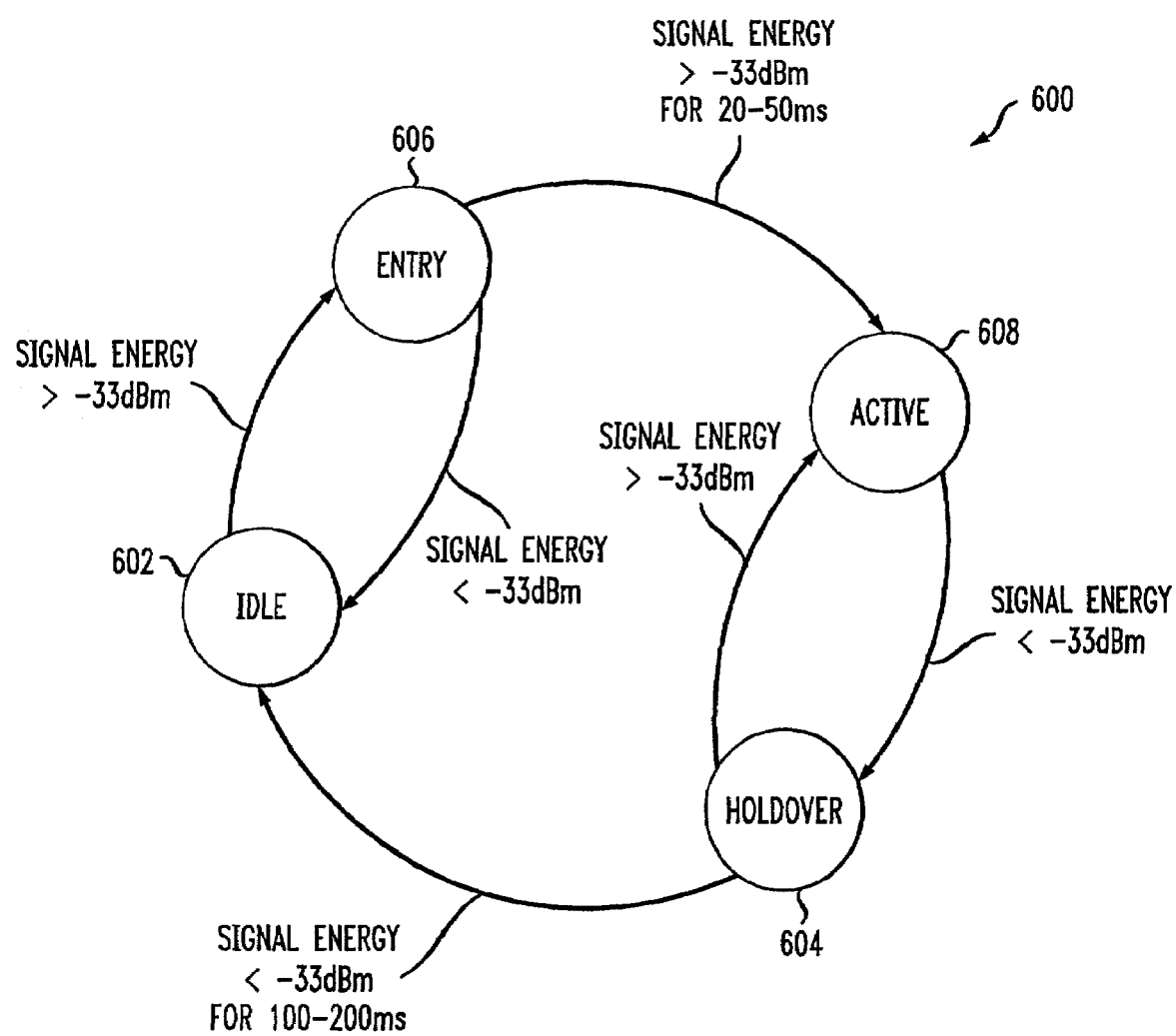
FIG. 6 is a state diagram of a state machine implemented in a signal detector for use with a facsimile signal.

As indicated above, the invention can be utilized with signals other than voice signals. FIG. 6 shows an example state diagram 600 that may be used in place of the state diagram 400 for detection of facsimile signals. The state diagram includes an idle state 602, a holdover state 604, and entry state 606 and an active state 608. The operation of the corresponding receiver and state machine is similar to that described in conjunction with FIG. 4, except that the transitions are based on an amount of detected signal energy relative to a −33 dBm signal level threshold. Other possible thresholds that may be used include −38 dBm and −43 dBm. Each of the −33 dBm, −38 dBm and −43 dBm thresholds correspond to ITU-T recommended line signal detection thresholds.

The invention is not limited to use with asynchronous transmission systems. For example, systems that are synchronous but become asynchronous over certain periods of time or under other conditions can make use of the invention.

In addition, although it is preferable to perform the signal detection in the decoded signal domain as in the illustrative embodiments, the invention can also be configured such that the detection is performed in the coded signal domain, through appropriate reconfiguration of the detection mechanism.

It should again be emphasized that the above-described embodiments of the invention are intended to be illustrative only. These and numerous other alternative embodiments within the scope of the following claims will be apparent to those skilled in the art.

What is claimed is:

1. A method for controlling a variable buffer used to store information associated with a received signal in a receiver of a packet-based communication system, the method comprising the steps of:

determining an adjustment time for making an adjustment to a current size of the variable buffer based at least in part on a result of a signal detection operation performed on the received signal, wherein the variable buffer stores reconstructed signal samples of the received signal, the reconstructed signal samples resulting from application of depacketization and reconstruction operations to corresponding received packets, the signal detection operation being applied to one or more of the reconstructed signal samples; and if the current buffer size at the determined adjustment time is not within a designated range of a target computed at least in part based on one or more jitter measurements, adjusting the current buffer size at the determined adjustment time.

2. The method of claim 1 wherein the current buffer size is adjusted at the determined adjustment time by an amount representative of a difference between the current buffer size and the target.

3. The method of claim 1 wherein the received signal has one or more signal portions and one or more silence portions associated therewith, and wherein the signal detection operation comprises detection of at least one of the signal portions and silence portions.

4. The method of claim 3 wherein the received signal comprises a voice signal and the signal portions comprise speech portions, and further wherein the signal detection operation comprises a speech detection operation.

5. The method of claim 1 wherein the received signal comprises a facsimile signal.

6. The method of claim 1 wherein the receiver comprises an Internet Protocol (IP) receiver of a voice-over-IP communication system.

7. A method for controlling a variable buffer used to store information associated with a received signal in a receiver of a packet-based communication system, the method comprising the steps of:
   determining an adjustment time for making an adjustment to a current size of the variable buffer based at least in part on a result of a signal detection operation performed on the received signal; and
   if the current buffer size at the determined adjustment time is not within a designated range of a target computed at least in part based on one or more jitter measurements, adjusting the current buffer size at the determined adjustment time;
   wherein the target is computed by applying a fast attack and slow decay filtering process to one or more jitter measurements made for packets transmitted through at least a portion of the system.

8. A method for controlling a variable buffer used to store information associated with a received signal in a receiver of a packet-based communication system, the method comprising the steps of:
   determining an adjustment time for making an adjustment to a current size of the variable buffer based at least in part on a result of a signal detection operation performed on the received signal; and
   if the current buffer size at the determined adjustment time is not within a designated range of a target computed at least in part based on one or more jitter measurements, adjusting the current buffer size at the determined adjustment time;
   wherein the current buffer size is not adjusted if the current buffer size at the determined adjustment time is within a designated range of the computed target.

9. The method of claim 1 wherein the signal detection operation is implemented using a state machine having at least an active state and an idle state.

10. A method for controlling a variable buffer used to store information associated with a received signal in a receiver of a packet-based communication system, the method comprising the steps of:
   determining an adjustment time for making an adjustment to a current size of the variable buffer based at least in part on a result of a signal detection operation performed on the received signal; and
   if the current buffer size at the determined adjustment time is not within a designated range of a target computed at least in part based on one or more jitter measurements, adjusting the current buffer size at the determined adjustment time;
   wherein the signal detection operation is implemented using a state machine having at least an active state and an idle state; and
   wherein the determined adjustment time corresponds to a time at which the state machine is in the idle state.

11. A method for controlling a variable buffer used to store information associated with a received signal in a receiver of a packet-based communication system, the method comprising the steps of:
   determining an adjustment time for making an adjustment to a current size of the variable buffer based at least in part on a result of a signal detection operation performed on the received signal; and
   if the current buffer size at the determined adjustment time is not within a designated range of a target computed at least in part based on one or more jitter measurements, adjusting the current buffer size at the determined adjustment time;
   wherein the signal detection operation is implemented using a state machine having at least an active state and an idle state; and
   wherein the state machine further includes an entry state, and the active state is entered from the entry state if a particular level of detected signal energy is present for at least a designated amount of time.

12. The method of claim 11 wherein the designated amount of time is about 20 to 50 milliseconds.

13. A method for controlling a variable buffer used to store information associated with a received signal in a receiver of a packet-based communication system, the method comprising the steps of:
   determining an adjustment time for making an adjustment to a current size of the variable buffer based at least in part on a result of a signal detection operation performed on the received signal; and
   if the current buffer size at the determined adjustment time is not within a designated range of a target computed at least in part based on one or more jitter measurements, adjusting the current buffer size at the determined adjustment time;
   wherein the signal detection operation is implemented using a state machine having at least an active state and an idle state; and
   wherein the state machine further includes a holdover state, and the state machine transitions from the holdover state to the idle state if a particular level of detected signal energy is not present for at least a designated amount of time.

14. The method of claim 13 wherein the designated amount of time is about 100 to 200 milliseconds.

15. The method of claim 11 wherein the state machine transitions from the idle state to the entry state upon detection of the particular level of detected signal energy.

16. The method of claim 11 wherein the state machine transitions from the entry state to the idle state if the state machine has not been in the entry state for more than the designated amount of time and the detected signal energy drops below the particular level.

17. A method for controlling a variable buffer used to store information associated with a received signal in a receiver of a packet-based communication system, the method comprising the steps of:
   determining an adjustment time for making an adjustment to a current size of the variable buffer based at least in part on a result of a signal detection operation performed on the received signal; and if the current buffer size at the determined adjustment time is not within a designated range of a target computed at least in part based on one or more jitter measurements, adjusting the current buffer size at the determined adjustment time;

wherein a given adjustment time is selected automatically and without regard to the signal detection operation if a signal packet is not received for at least a designated amount of time.

18. The method of claim 17 wherein the designated amount of time corresponds to two packet periods.

19. An apparatus for use in a receiver of a packet-based communication system, the apparatus comprising:

a variable buffer having an adjustable size and being configured for storing information associated with a received signal in the receiver of the packet-based communication system; and a processor coupled to the variable buffer and controlling the adjustable size thereof, the processor determining an adjustment time for making an adjustment to a current size of the variable buffer based at least in part on a result of a signal detection operation performed on the received signal;

wherein if the current buffer size at the determined adjustment time is not within a designated range of a target computed at least in part based on one or more jitter measurements, the current buffer size is adjusted at the determined adjustment time; and wherein the variable buffer stores reconstructed signal samples of the received signal, the reconstructed signal samples resulting from application of depacketization and reconstruction operations to corresponding received packets, the signal detection operation being applied to one or more of the reconstructed signal samples.

20. An article of manufacture comprising a machine-readable medium for storing one or more software programs for use in adjusting the size of a variable buffer used to store information associated with a received signal in a receiver of a packet-based communication system, wherein the one or more software programs when executed implement the steps of:

determining an adjustment time for making an adjustment to a current size of the variable buffer based at least in part on a result of a signal detection operation performed on the received signal, wherein the variable buffer stores reconstructed signal samples of the received signal, the reconstructed signal samples resulting from application of depacketization and reconstruction operations to corresponding received packets, the signal detection operation being applied to one or more of the reconstructed signal samples; and if the current buffer size at the determined adjustment time is not within a designated range of a target computed at least in part based on one or more jitter measurements, adjusting the current buffer size at the determined adjustment time.

* * * * *